March 31, 1970     R. D. GOOD     3,503,854
DUAL STAGE STEAM STRIPPING OF VEGETABLE OILS AT DUAL PRESSURES
Filed Aug. 22, 1967
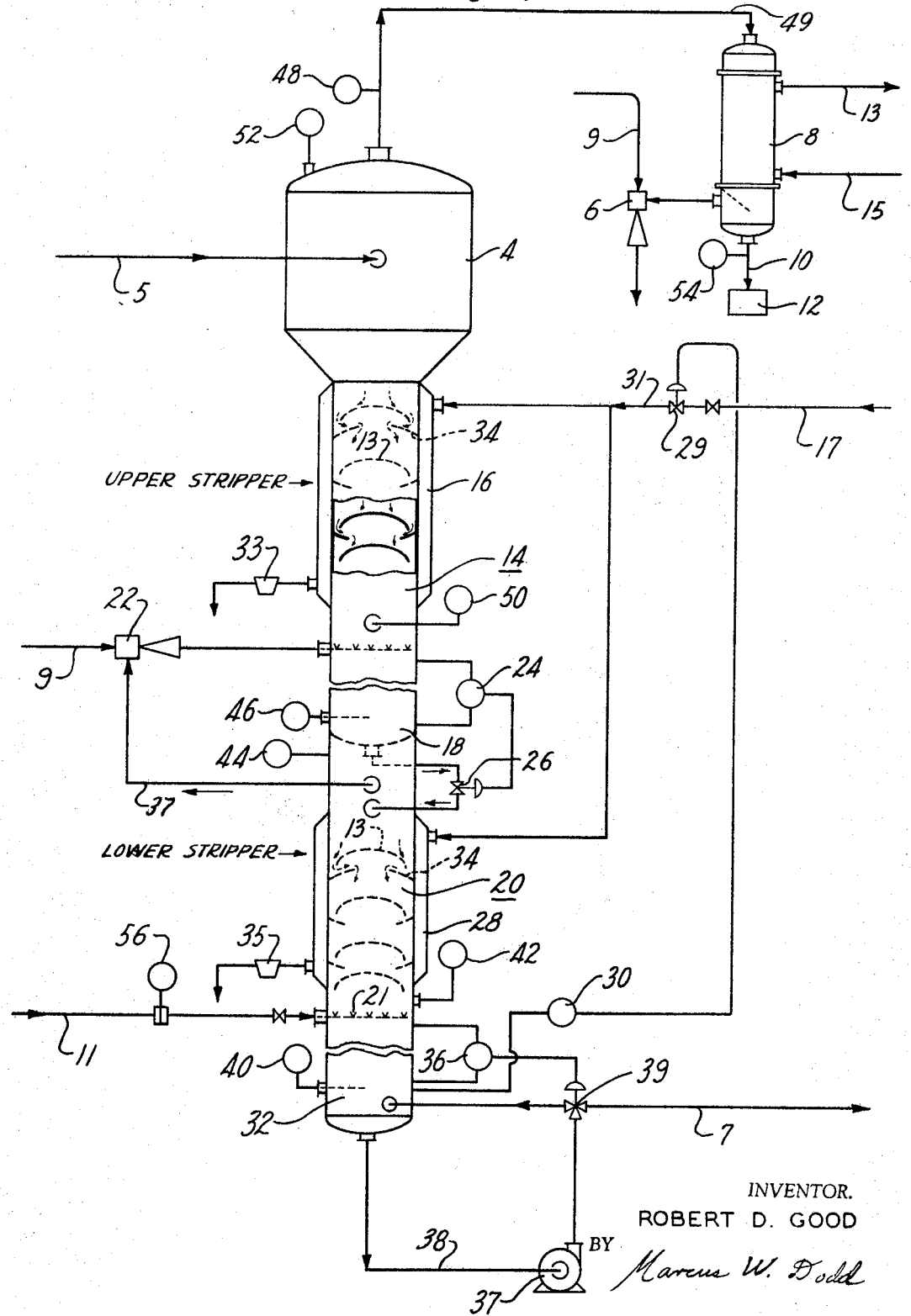
INVENTOR.
ROBERT D. GOOD
BY Marcus W. Dodd
ATTORNEY

3,503,854
DUAL STAGE STEAM STRIPPING OF VEGETABLE OILS AT DUAL PRESSURES
Robert D. Good, Pittsburgh, Pa., assignor to Blaw-Knox Company, Pittsburgh, Pa., a corporation of Delaware
Filed Aug. 22, 1967, Ser. No. 662,503
Int. Cl. B01d 3/10, 3/42
U.S. Cl. 203—79
2 Claims

ABSTRACT OF THE DISCLOSURE

This invention essentially comprises a two-stage stripping system for removing residual solvent from solvent-extracted oil in which both stages are operated at subatmospheric pressure, the first stage being at relatively higher pressure (e.g. 200–400 mm. Hg absolute) and the second stage at relatively lower pressure (e.g. 50–100 mm. Hg absolute), in which the stripping gas or vapor from the second (high vacuum stage) is compressed and reused in the first (low vacuum) stage.

BACKGROUND OF THE INVENTION

Field of invention (a) Effectively remove (strip) solvent from freshly extracted crude vegetable oils while limiting maximum processing temperature of the oils to values such as 75° C. to 85° C. The lecithins and other by-products separated by subsequent processing of the low temperature processed oils have superior quality compared with those made from oils which are stripped at normal temperatures such as 100° C. to 120° C.

(b) Effectively remove (strip) solvent from large quantities per unit time of freshly extracted vegetable oils while at the same time limiting the volume of stripped solvent vapor that must be handled by a vacuum producing device such as an ejector or vacuum pump.

Description of prior art

In the solvent extraction of vegetable oils from meal and similar materials, one of the products of the extractor is a solution of vegetable oil and solvent which is immiscible with water. This solution of oil and solvent is usually called miscella. In the usual processing operation the miscella is concentrated from about 15–35% (by weight) initial oil content to about 85–95% oil content in one or more evaporators. Such evaporators may be heated by steam or by condensing hot vapors from other plant equipment such as the meal desolventizing equipment. The evaporator(s) operate under atmospheric or subatmospheric pressure—depending upon the process requirements. If operated under partial vacuum over the boiling miscella, the maximum temperature at which the miscella is concentrated by evaporation may be limited to such values as 75° C. or 85° C., thus satisfying any temperature limitation during this operation, while still producing a concentrated miscella of about 85–95% oil. This concentrated miscella is suitable as feed to an oil stripper, wherein the well-known chemical engineering unit operation of steam stripping is carried out.

The solvent vapor and stripping steam flow upward through the oil stripper and are conducted to a condenser along with the initially flashed solvent vapor. Depending on the cooling water temperature, the operating pressure inside the condensing space, and the adequacy of the condensing surface, most of the steam is condensed.

The design cooling water temperature of a processing plant in most areas of the world's temperate zone where vegetable oil extraction is carried out is about 30° C. If the cooling water is about 30° C., then little, if any, solvent vapor will condense at the pressures commonly used in the oil stripper system. The vacuum pump, or ejector, must then pump these solvent vapors out of the system along with uncondensed steam and noncondensibles such as air which leaks into the system. These vapors, along with the evacuating steam, if an ejector is used, then flow to another condenser or alternate device which has the capability of recovering the valuable solvent as a liquid at a suitable pressure above the solvent dewpoint.

SUMMARY OF INVENTION

As can be seen in the foregoing description of the historical operation, the primary problem is to handle the solvent vapor economically where (1) crude oil quality is to be maintained;
(2) an adequate supply of low temperature cooling water is not available, e.g. such as 15° C. year-round maximum, and if either:
    (a) a large quantity of solvent (hexant) is to be removed in the oil stripper per unit time, such as 750 lbs./hour or more (this is the situation in the usual soybean extraction plant processing more than 500 tons/day of soybeans) or,
    (b) the processor wishes to limit the maximum oil temperature to a value such as 75° C. or 85° C.

Oil strippers of many designs have been used over the years, all having contacting sections, wherein the steam (or other stripping gas) obtains intimate contact with the liquid miscella and removes the solvent by vaporization. These contactors are customarily operated under subatmospheric pressure, but this is not a requirement for the removal of the solvent, as the solvent can be removed under atmospheric pressure. The reason for subatmospheric pressure operation is to reduce the quantity of stripping steam, to promote evaporation of the solvent, and to keep the crude oil product reasonably dry. Crude oil is customarily sold with a total moisture and volatile matter content of less than 0.2 weight percent. Both condensed steam and residual solvent are found in tests for total moisture and volatile matter.

The customary contacting sections of oil strippers have included disc and donut trays, bubble cap trays, sieve trays, packed sections, e.g. Raschig rings, stoneware, Berl saddles and other forms of tower packings, and other devices commonly used for distillation operations.

During normal operation of a single pressure oil stripper, the concentrated miscella (85–95% by weight oil) flows into the upper evacuated space of the oil stripper where some solvent vapor flashes off due to the reduced pressure. The miscella then flows downward through the contacting sections whose function is to produce a thin film of liquid miscella so that steam can effectively strip the solvent; i.e. cause it to vaporize. The miscella continues downward through the contacting sections being successively contacted with upward flowing steam. In the bottom-most contacting section the well-stripped oil is contacted with fresh steam yielding a product with a moisture and volatile content well below the limitation of 0.2% set by marketing rules. The oil is then withdrawn usually by a pump under level control.

The quantity of solvent vapor to be handled by the vacuum pump or ejector can be reduced by condensing if the condenser pressure is about ½ atmosphere or higher, allowing most of the steam and solvent vapor to condense at about 40° C. This drastically reduces the load of non-condensed gas to be handled by the vacuum pump or ejector. On the other hand, at that pressure the crude stripped oil will tend to be wet and excessive stripping steam will be necessary to remove solvent. The maximum temperature limitation on the crude oil of about 75° C. to 85° C. can only be satisfied by stripping at much lower pressures, say 0.10 to 0.15 atmosphere.

The present invention satisfies these requirements by operating the condensing section and the pre-stripping section at a moderate vacuum, say 200 to 400 mm. Hg absolute. The final stripping section is operated at a substantially lower absolute pressure, say 50 to 100 mm. Hg absolute. The main supply of stripping steam is introduced into the final low pressure stripping section where it removes the last fractional percent of solvent producing quality crude oil. This steam and small quantity of solvent vapor are then evacuated through a steam operated high vacuum ejector into the pre-stripping section of the oil stripper where the bulk of the solvent vapor is stripped from the oil. It should be noted that the evacuating steam which powers the ejector is used again in the pre-stripping section to remove the bulk of the solvent vapor. By proper selection of the ejector, it is found that only slightly more steam unit of oil processed is used for the previously more steam per unit of oil processed is used for the previously used single pressure oil stripper.

BRIEF DESCRIPTION OF THE DRAWING

The single figure in the drawing is a schematic showing of apparatus in accordance with my invention.

DESCRIPTION OF PREFERRED EMBODIMENTS

In accordance with a preferred embodiment of my invention as shown in the drawing, I provide stripping apparatus comprising and upper head 4 or tank into which hot miscella is fed from the evaporator system thru the line 5. The upper head 4 of the oil stripper is maintained at a pressure of 200 to 400 mm. of mercury absolute by a stripper ejector 6 which is connected through a stripper condenser 8 to an outlet in the top of the upper head 4. The stripper condenser 8 comprises a tank having conduits 13, 15 for circulating cooling water therethrough and means for causing the steam and hexane vapor coming from the upper head of the oil stripper to be cooled by, but not in direct connection with, the cooling water. The stripper ejector 6 is connected at or near the bottom end of the stripper condenser 8 and is operated by steam from the steam line 9 expanding to create a vacuum thereby evacuating steam and hexane vapor from the interior of the stripper condenser 8. At the bottom end of the stripper condenser a conduit 10 is connected which leads to a condenser pump 12 (or barometric leg) for pumping the liquid condensed by the stripper condenser out of the stripper condenser. Since gas is being constantly evacuated from the top of the upper head 4 of the oil stripper, therefore, as the miscella moves into the upper head some of the solvent flashes off inside of the upper head and joins steam and solvent vapor flowing up from the upper contacting section 14 of the oil stripper below.

Immediately beneath the upper head of the stripper there is the upper contacting section 14 of the oil/stripper, which in the preferred embodiment of my invention, is an elongated vertical round tank having disposed therein a series of disc and donut trays 13. Around the outside of the upper contacting section 14, I provide a steam jacket 16 supplied with steam from a steam line 17 for heating the upper contacting section 14. It will be noted that whereas I have described a series of disc and donut trays 13, it is, however, understood that in accordance with other embodiments of my invention that many other suitable contactor means of types well known in the art may be used. As the miscella flows downward through the upper contacting section 14, steam moves up through the upper contacting section 14 whereby solvent is continuously vaporized from the miscella which is flowing downward through the upper contacting section 14. When the liquid miscella reaches the upper collecting pot 18 at the bottom of the upper contacting section 14, the miscella has reached a concentration of well over 99% oil.

The upper collecting pot 18 is located at the bottom end of the upper contactor so as to receive miscella from the upper contactor by gravity flow. Below the collecting pot 18 is the lower contacting section 20 which is built similarly to the upper contacting section 14 having therein another series of disc and donut trays 13. Super-heated steam is introduced into the lower end of the lower contacting section from the sparge steam line 11 through nozzle(s) 21 to complete the stripping of solvent from the msicella as the miscella flows downward through the trays 13 counter-currently to the upwardly flowing steam.

Connected between the upper 14 and lower 20 sections of the oil stripper, I provide a high vacuum ejector 22 which is a single stage steam jet ejector which compresses steam and vapors from the pressure in the lower section 20 which is between 50 to 100 mm. of mercury absolute up to the pressure of 200 to 400 mm. of mercury absolute, which is the pressure in the upper section 14 of the oil stripper. It will be noted that single stage ejectors normally have compression ratios of about 4 to 1. Thus the lower section 20 pressure can be 50 mm. of mercury absolute which with a 4 to 1 compression ratio yields 200 mm. of mercury absolute in the upper section 14 and then a 3.8 to 1 compression ratio is necessary to attain atmospheric pressure. Thus, this apparatus uses economical single stage ejectors but achieves the effect of more expensive two-stage ejectors. It will be noted that the contacting steam for the upper contacting section is primarily the steam that is used to power the high vacuum ejector 22 which evacuates into the upper contacting section.

The collecting pot 18 in the upper stage is connected through a valve 26 under control of a level controller 24 to the lower stage. Since the lower section 20 is at a lower pressure than the upper section 14, the miscella collecting in the collecting pot 18 of the upper section would move freely into the lower section if unimpeded. However, in order to maintain the differential in pressure between the upper section 14 and the lower section 20, it is desirable to have a level controller 24 controlling a valve conduit 26 connecting the collecting pot 18 of the upper section and the lower section 20 so as to restrict the flow of miscella from the upper section to the lower section or, alternatively, a barometric leg can be used.

The lower contacting section is also provided with a steam jacket 28 which is maintained, as is the upper steam jacket, at from 15 to 5 p.s.i.g. steam pressure. The steam jackets 16, 28 maintain the processing temperature of the oil during evaporation. A temperature controller 30 may be employed which senses the output oil temperature so as to regulate the steam pressure in the jacket and thereby maintain the desired oil temperature during processing. The temperature controller 30 is connected near the bottom of the second chamber and operates to control the valve 29 in the heating steamline 31 which leads into the steam jackets 16, 28. The steam condensate leaves the steam jackets through the output traps 33, 35.

Both the upper and lower contacting sections have disc and donut trays which are arranged so as to tend to direct the thin oil film outward toward the hot walls of the vessel next to the steam jacket. It will be observed that when the solvent is flashed off from the miscella, the liquid temperature is lowered. By bringing the oil into contact with the hot wall of the vessel inside the jacket, the oil temperature will be brought back to the desired temperature which is approximately the inlet miscella temperature. This is accomplished by using some of the donuts of inverted design as shown at 34, to direct the miscella against the wall of the vessel. The processed miscella is removed from the second collecting pot 32 at the bottom of the second contactor 20 by means of an output pump 37, or alternatively a barometric leg, connected to the oil output line 7, the ouput of which is controlled by a level controller 36 connected to the second collecting pot 32 so as to shunt part of the product oil thru the shunt valve 39 back into the second collecting pot 32 if the oil level becomes too low. This allows the pump 37 to run at constant speed because when the supply rate is below the flow rate of the pump, the valve 39 is changed so as to shunt part of the flow back into the second chamber 20.

For a more effective control of the process of my invention I have provided temperature and pressure meters as follows: I provide a temperature meter 40 inserted into the bottom of the lower collecting pot of the second chamber 20, a lower pressure gauge 42 connected in the region just above where the sparge steam enters the second chamber 20 and an upper pressure meter 44, connected near the top of the second chamber. In the collecting pot of the first chamber 14, at the bottom of the first chamber, I provide a temperature gauge 46, and on the outlet line from the first chamber 14, connected to the top of the first chamber, I provide an output temperature gauge 48 for registering the output temperature of solvent and steam from the first chamber. Near the lower end of the first chamber 14 and above the point where sparge steam and solvent vapor enter the first chamber, I provide an input pressure meter 50 and at the top of the first chamber I provide an output pressure meter 52 for showing the pressure in the top of the first chamber. On the output line 10 from the condenser I provide a temperature gauge 54 for recording the temperature of the output condensate leaving the condenser. In the input line for sparge steam connecting into the second chamber, I provide a steam flow meter 56 for recording the rate of flow of sparge steam into the second chamber.

In the theory of operation in accordance with my invention the presence of steam in the chambers serves to reduce the effective surface pressure on the solvent in the miscella. Therefore, as a general principle of application it is desirable that sufficient steam is added at the ejector (or mechanical pump) 22 so that the gas coming out of the top of the first chamber and being fed to the condenser is also not saturated with solvent vapor. Since it is difficult to maintain an exact control and an exact determination of the degree to which the gases are saturated with solvent vapor it is desirable to maintain an excess of steam throughout the system at all times. While the foregoing has been directed toward vegetable oil, nevertheless it is to be understood that besides the use of the dual pressure oil stripper in the vegetable oil field, the following are some additional possible uses:

(1) Strip light components from synthetic organic chemicals.
(2) Strip alcohols from heat sensitive esters.
(3) Strip volatile components from the products of:
    (a) transesterification reactions,
    (b) alkylation reactions.
(4) Strip monomers from polymerization products.

As can be seen from the above, the unit is useful for separating low boiling compounds from high boiling compounds by the use of a stripping medium. The stripping medium is commonly steam, chosen for its availability, its condensing temperature, and its other well-known properties. However, it is understood that other stripping media could be used according to process requirements.

While the term "pump" has been used herein to describe the elements 12 and 37, nevertheless the term "pump" is to be interpreted as including mechanical pumps, ejectors and barometric legs. Also the term "restricted fluid conduit" includes level controlled valves and barometric legs, or any other level controlled restricted flow apparatus.

What is claimed is:
1. Apparatus for removing residual solvent from a miscella of solvent-extracted vegetable oils comprising an upper stripper means having sidewalls forming a head section disposed above a contacting section which is disposed above a collecting section, a lower stripper means disposed below said upper stripper means and having sidewalls forming a contacting section disposed above a collecting section, means for supplying miscella to said head section for travel through said stripper means in one direction, means for supplying steam to the lower end of each of said contacting sections for travel through said stripper means in a direction counter-current to that of said miscella, said contacting sections each containing disc and donut type film formers for contacting and stripping said miscella with said steam and for contacting at least a part of said miscella with the sidewalls of said contacting sections, means for transferring miscella from said collecting section of said upper stripper means to the upper end of the contacting section of said lower stripper means including valve means responsive to level control means connected with said collecting section of said upper stripper means and responsive to the amount of miscella collected therein, means for transferring product from said collecting section of said lower stripper means to product storage, said contacting sections each having jacket type exterior heating means responsive to temperature control means including valve means responsive to product temperature sensing means connected to the collecting section of said lower stripper means, means for maintaining a subatmospheric pressure in said upper stripper means and for transferring steam and solvent vapor from said head section to a stripper condenser means including steam jet ejector means connected to said stripper condenser means, and means for maintaining a lower subatmospheric pressure in said lower stripper means than in said upper stripper means and for transferring steam and solvent vapors from the upper end of the contacting section of said lower stripper means to the lower end of the contacting section of said upper stripper means including steam jet ejector means connected therebetween and evacuating into said upper stripper means.

2. In the process of removing residual solvent from a miscella of hexane solvent-extracted vegetable oils in two stages at different subatmospheric pressures, the improvement comprising the steps of maintaining the first stage of the process at a subatmospheric pressure of from about 200 mm. to 400 mm. of mercury absolute, maintaining the second stage of the process at a subatmospheric pressure of from about 50 mm. to 100 mm. of mercury absolute, conveying miscella through said first stage and then said second stage in one direction and steam through said stages in the opposite direction, contacting and stripping the miscella with said steam in both stages, contacting at least a part of the miscella with variably heated sidewalls containing said stages, maintaining miscella temperature of from about 75° C. to 85° C. by varying the heat input to said sidewalls, withdrawing product from the end of said second stage to product storage and withdrawing steam and solvent vapors from the head of said first stage to a condenser.

(References on following page)

References Cited

UNITED STATES PATENTS

| | | | |
|---|---|---|---|
| 37,258 | 12/1862 | Miller | 202—236 |
| 2,041,059 | 5/1936 | French | 202—236 |
| 2,343,646 | 3/1944 | Dinley | 202—236 |
| 2,585,202 | 2/1952 | Whitney | 202—236 |
| 3,393,133 | 7/1968 | Baird | 202—236 |
| 2,070,864 | 2/1937 | Ragatz | 203—78 |
| 2,152,164 | 3/1939 | Wentworth | 203—26 |
| 2,161,798 | 6/1939 | Carter | 203—49 |
| 2,327,643 | 8/1943 | Houghland | 203—26 |
| 2,461,694 | 2/1949 | McCubbin et al. | 203—78 |
| 2,559,129 | 7/1951 | Miller | 203—80 |
| 2,627,500 | 2/1953 | Potts et al. | 203—78 |
| 2,674,609 | 4/1954 | Beal et al. | 260—428.5 |
| 2,901,406 | 8/1959 | Kirschenbaum et al. | 203—78 |
| 2,901,407 | 8/1959 | Colton | 203—78 |
| 3,017,289 | 1/1962 | Miller et al. | 202—206 |
| 3,249,519 | 5/1966 | Cabbage et al. | 203—2 |

OTHER REFERENCES

A. Bailey: Industrial Oil and Fat Products, 2nd ed., 1951, Interscience Publishers, Inc., New York, N.Y., pp. 600 and 601.

WILBUR L. BASCOMB, JR., Primary Examiner

U.S. Cl. X.R.

202—154, 160, 205, 206, 233, 234, 236; 203—1, 2, 72; 260—428.5

UNITED STATES PATENT OFFICE
CERTIFICATE OF CORRECTION

Patent No. 3,503,854                            March 31, 1970

Robert D. Good

It is certified that error appears in the above identified patent and that said Letters Patent are hereby corrected as shown below:

Column 3, line 36, cancel "more steam unit of oil processed is used for the previously --; line 37, after "used" insert -- than --; line 47, "and" should read -- an --. Column 4, line 28, "msicella" should read -- miscella --.

Signed and sealed this 22nd day of December 1970.

(SEAL)
Attest:

Edward M. Fletcher, Jr.                       WILLIAM E. SCHUYLER, JR.
Attesting Officer                              Commissioner of Patents